United States Patent [19]

Focke et al.

[11] Patent Number: 5,338,150
[45] Date of Patent: Aug. 16, 1994

[54] APPARATUS FOR HANDLING ARTICLES, SUCH AS CARTONS

[75] Inventors: Heinz Focke, Verden; Johannes Holloch, Langwedel, both of Fed. Rep. of Germany

[73] Assignee: Focke & Co. (GmbH & Co.), Verden, Fed. Rep. of Germany

[21] Appl. No.: 779,877

[22] Filed: Oct. 21, 1991

[30] Foreign Application Priority Data

Oct. 23, 1990 [DE] Fed. Rep. of Germany ....... 4033587

[51] Int. Cl.[5] .............................................. B60N 2/02
[52] U.S. Cl. .................................. 414/799; 414/792.9; 414/796.9; 294/67.31; 294/115
[58] Field of Search .................. 414/796.9, 792.9, 799; 294/106, 67.31

[56] References Cited

U.S. PATENT DOCUMENTS

| | | |
|---|---|---|
| 2,743,954 | 5/1956 | Ostlund . |
| 3,429,459 | 2/1969 | Paul et al. . |
| 3,549,192 | 12/1970 | Cassady ............................ 294/106 |
| 3,759,563 | 9/1973 | Kitamura ............................ 294/106 |
| 4,401,407 | 8/1983 | Breckenridge .................... 294/106 |
| 4,701,091 | 10/1987 | Yamauchi et al. ............... 414/791.6 |
| 4,743,055 | 5/1988 | Dantan ................................ 294/113 |
| 4,907,834 | 3/1990 | dejong et al. ...................... 294/115 |
| 5,141,274 | 8/1992 | Hayden et al. ................... 414/792.9 |

FOREIGN PATENT DOCUMENTS

| | | |
|---|---|---|
| 18757 | 4/1960 | Fed. Rep. of Germany . |
| 2350919 | 4/1975 | Fed. Rep. of Germany . |
| 2410769 | 6/1979 | Fed. Rep. of Germany . |
| 3317765 | 11/1983 | Fed. Rep. of Germany . |
| 3540121 | 5/1987 | Fed. Rep. of Germany ... 294/67.31 |
| 3802620 | 8/1989 | Fed. Rep. of Germany . |
| 3837413 | 5/1990 | Fed. Rep. of Germany . |
| 1287442 | 2/1962 | France . |
| 202218 | 11/1983 | Japan .............................. 414/792.9 |
| 577423 | 7/1976 | Switzerland . |
| 984861 | 1/1983 | U.S.S.R. ............................ 294/115 |

*Primary Examiner*—Michael S. Huppert
*Assistant Examiner*—Gregory A. Morse
*Attorney, Agent, or Firm*—Sughrue, Mion, Zinn, Macpeak & Seas

[57] ABSTRACT

In the packaging art, palletizers (23) serve for transporting, i.e. lifting, conveying and depositing cartons (10) and the like. A gripper (27) is located on an articulated arm (24) and is provided with upright carrying arms (29, 30) and carrying legs (31, 32) arranged thereon for grasping the cartons (10) at their bottom side. The carrying legs can be pivoted from a horizontally directed carrying position to an essentially vertical release position which allows a trouble-free lifting of the gripper after a carton has been deposited, even if there is little space. The carrying arms 29, 30 of the gripper 27 are themselves pivotable from an essentially upright position to an inclined position in which they are spread apart in order to be able to grasp cartons when the carrying legs (31, 32) are horizontally directed.

11 Claims, 8 Drawing Sheets

APPARATUS FOR HANDLING ARTICLES, SUCH AS CARTONS

BACKGROUND OF THE INVENTION

The invention relates to an apparatus for receiving, conveying and depositing articles, especially cartons, with a liftable and lowerable and transversely movable gripper for grasping at least one article (carton) with upright carrying arms which during transport of an article (carton) extend on both sides of said article, and with carrying legs pivotably attached to the carrying arms, said carrying legs being movable into a horizontally directed carrying position and an essentially vertically directed release position by means of upright actuating means (actuating webs).

The invention is concerned with a subject of the transporting art, specifically with handling cuboidal articles, especially relatively large cartons. These cartons are delivered for example on a feed conveyor (belt or roller conveyor) and are transferred for example onto a pallet or another conveyor. Mainly palletizers, also known as robots, are used for this purpose. A gripper attached to the end of an articulated arm serve s for grasping the article (cartons). The articulate d arm itself is rotatably and liftably mounted on a support column. Such a palletizer is for example disclosed in DE-A-37 20 933.

The invention is particularly concerned with the structure of a gripper for a conveying apparatus of this or of a different kind. The known grippers comprising suction means for grasping the articles a t the top side can quite often not be employed, for example if the cartons are open at the top and contain individual articles. In these cases, the articles have to be grasped at the bottom side by mechanical carrying means.

SUMMARY OF THE INVENTION

The invention is based on the object to develop further and improve a conveying apparatus with a gripper of the above described kind in such a way that even such a gripper can deposit the articles closely adjacent to other articles, for example to form tiers on a pallet.

To attain this object, the apparatus or its gripper according to the invention is characterized in that the carrying legs are designed as one-armed levers and the actuating means (actuating webs) are connected to the carrying legs in an articulated manner at a distance from the carrying arms at the side confronting the article (carton), in such a way that the carrying legs are held in the carrying position by tensile forces in the actuating means (actuating webs).

This design of the gripper allows to grasp and handle the articles when the carrying legs are transversely directed. After or just before the article is deposited, the carrying legs are pivoted to a position in which they are disengaged from the article, so that the gripper can be moved upwards.

In this process, the carrying legs, being in the upright or vertical position, only require a narrow gap-like space for their upward movement. As a result, the articles can be placed relatively tightly side by side.

The carrying legs are mounted on upright carrying arms of the gripper, particularly on the lower ends of the carrying arms. The carrying arms are designed such that they too only require very little space. Accordingly, the carrying arms are designed preferably as wide plates and the carrying legs are pivotably attached to their lower edge via hinges.

The carrying legs are actuated, i.e. moved from the top portion of the gripper. For this purpose, actuating means in the form of thin-walled push and traction means lead to the carrying legs. In a preferred embodiment, these actuating means are designed as actuating webs having a flat section.

The carrying legs are mounted as two-armed pivotable levers. A short free actuating end is pivotably connected to the lower end of the actuating webs via a (second) hinge. When the carrying legs are in the upright position, the two hinges are located above one another so that the transverse dimensions are small.

In order to actuate the carrying legs, actuating means in the form of pressure medium cylinders (such as hydraulics) are arranged on a support assigned to the pivoting arm of the conveying apparatus.

It is a further outstanding feature of the invention that several, especially two, groups of two oppositely situated carrying arms including carrying legs are provided. With a gripper equipped in this manner, several articles at one time, especially two articles in juxtaposition, or a double-sized article can be grasped. Since the carrying means, i.e. the carrying arms and carrying legs can be actuated individually or in groups, it is possible to deposit the grasped articles individually.

Further features of the invention relate to the structure of the gripper and the carrying means for the articles and to the conveying apparatus as a whole.

An exemplary embodiment will be described below in detail with reference to the drawings, in which:

DESCRIPTION OF A PREFERRED EMBODIMENT

Figure 1:
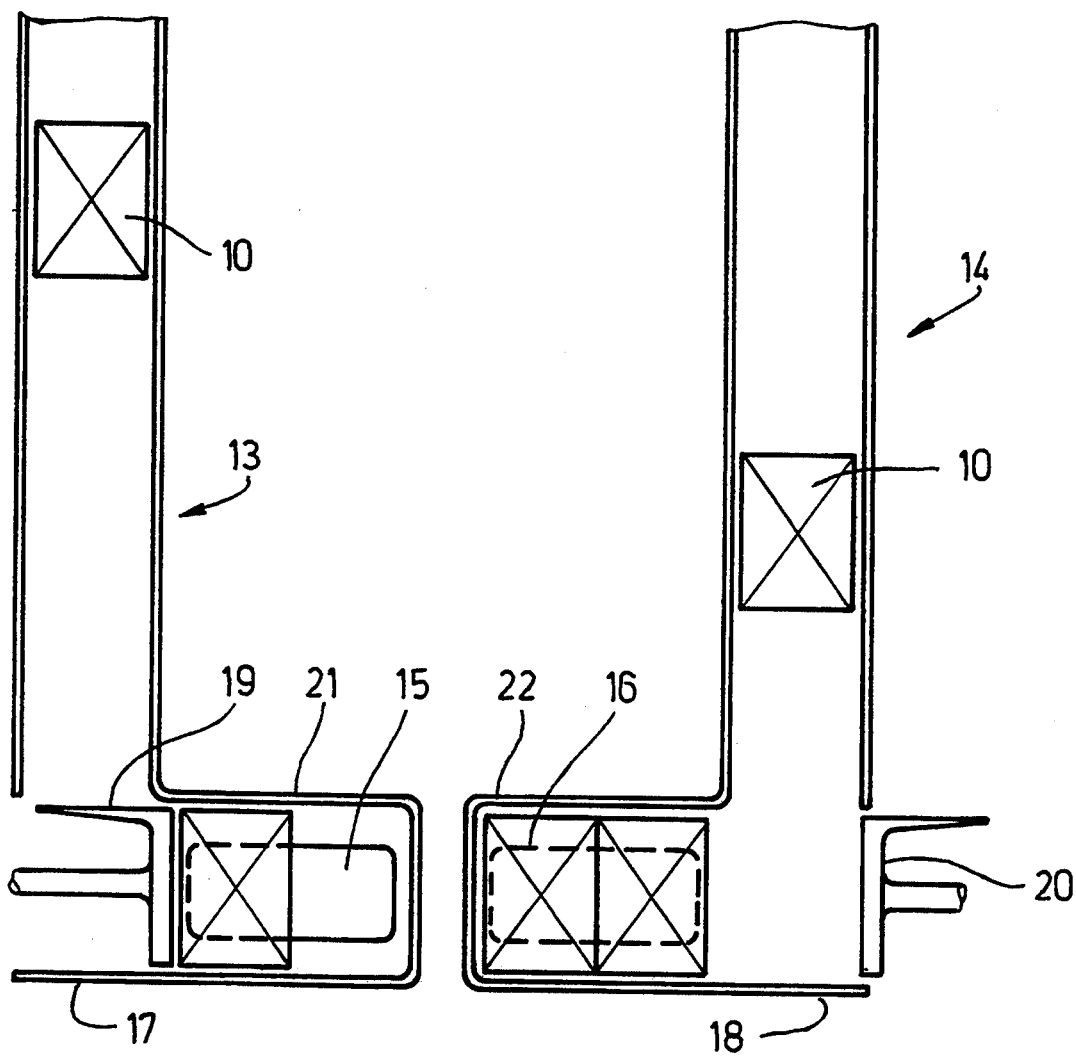
FIG. 1 is a plan view of an installation for loading (two) pallets with cartons.
Figure 1:
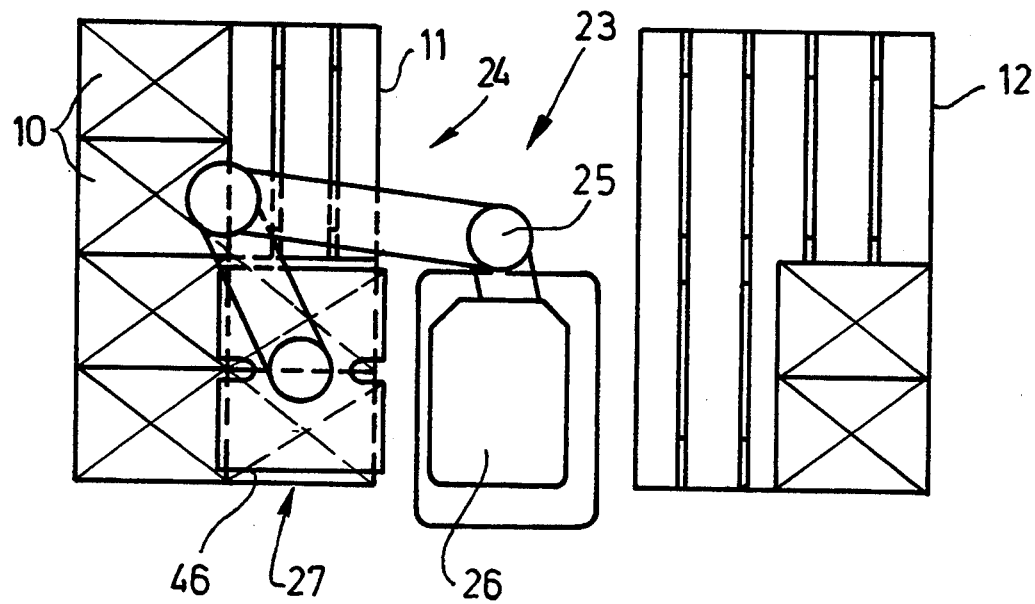

The exemplary embodiment illustrated is concerned with the handling of cuboidal articles, particularly cartons 10. These cartons are preferably of the type which can not be grasped at the top side, such as cartons being open at the top and containing individual packs, for example for biscuits. The cartons 10 have to be transferred to pallets 11, 12. With the assembly of FIG. 1, the cartons 10 are coming from a packaging machine and are delivered by two spaced feed conveyors 13, 14 at irregular intervals. At the ends of the feed conveyors 13, 14, the cartons 10 are pushed onto a platform 15, 16 which is arranged laterally offset relative to the feed conveyor 13, 14, specifically in relation to confronting sides.

The cartons 10 are transported on the feed conveyors 13, 14 until they come up against an end stop 17, 18. In this position, the delivered carton 10 can be engaged by a pusher 19, 20 which pushes the carton 10 transversely to the feeding direction onto the platform 15, 16.

The platforms 15, 16 are liftable and lowerable so that the cartons 10 can be lifted out of the region of lateral guide rails 21, 22 for further handling. The guide rails 21, 22 also form a stop for positioning the cartons 10 on the platform 15, 16. Additionally, the platform 15, 16 can cover part of the lifting distance during transport of the cartons 10.

An outstanding feature of the present embodiment is the handling of two cartons 10 at a time. The dimensions of the platforms 15, 16 are defined such that they can receive two cartons 10 at a time. These cartons 10 are pushed on the platforms 15, 16 one after the other and are discharged together.

A palletizer 23 serves for taking over the cartons 10 from the platform 15, 16 and for depositing them on the one or the other pallet 11, 12. This palletizer 23 is provided with an articulated arm 24 which is pivotable about a pivot bearing 25. The pivot bearing 25 can be moved up and down together with the articulated arm 24 on an upright supporting device 26. The palletizer 23 is designed in a known manner in such a way that the cartons 10 can be transported with the articulated arm 24 from the platform 15, 16 to the desired position on the pallet 11, 12.

A gripper 27 is arranged at the free end of the articulated arm 24. This gripper 27 is designed such that the cartons 10 can be grasped, lifted, transported and deposited on the pallets 11, 12. In the present exemplary embodiment, the dimensions of the gripper 27 are defined such that the two cartons 10 lying side by side on the platform 15, 16 can be both grasped together and be deposited either together or individually.

Figure 3:
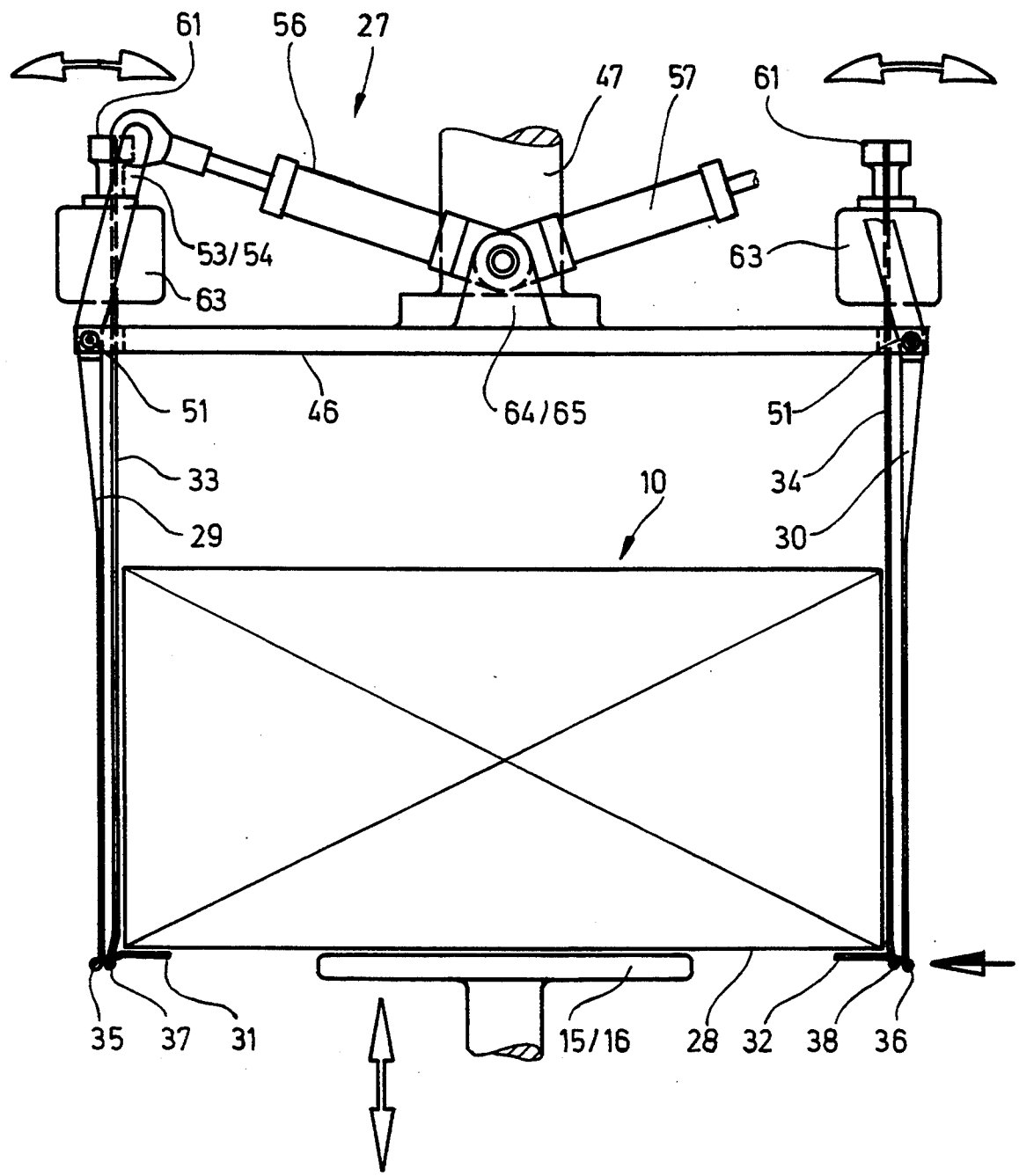
FIG. 3 is a view corresponding to FIG. 2, showing a gripper picking up an article.

The gripper 27 is designed such that for a handling, i.e. transportation of the cartons 10, these are grasped at the bottom side. In the present case, the cuboidal cartons 10 are grasped at two oppositely situated narrow sides in the region of an edge strip of a bottom wall 28. For this purpose, the gripper 27 is equipped with two oppositely situate d carrying arms 29, 30 which are spaced at a distance which corresponds to the respective (longitudinal) dimension of the carton 10. Carrying legs 31, 32 are located at the lower ends of the carrying arms 29, 30. These carrying leg s 31, 32 are (approximately) horizontally directed for receiving and transporting the cartons 10. When the carrying arms 29, 30 are arranged upright, the carrying legs 31, 32 move underneath edge portions of the carton 10 (FIG. 3).

Figure 4:
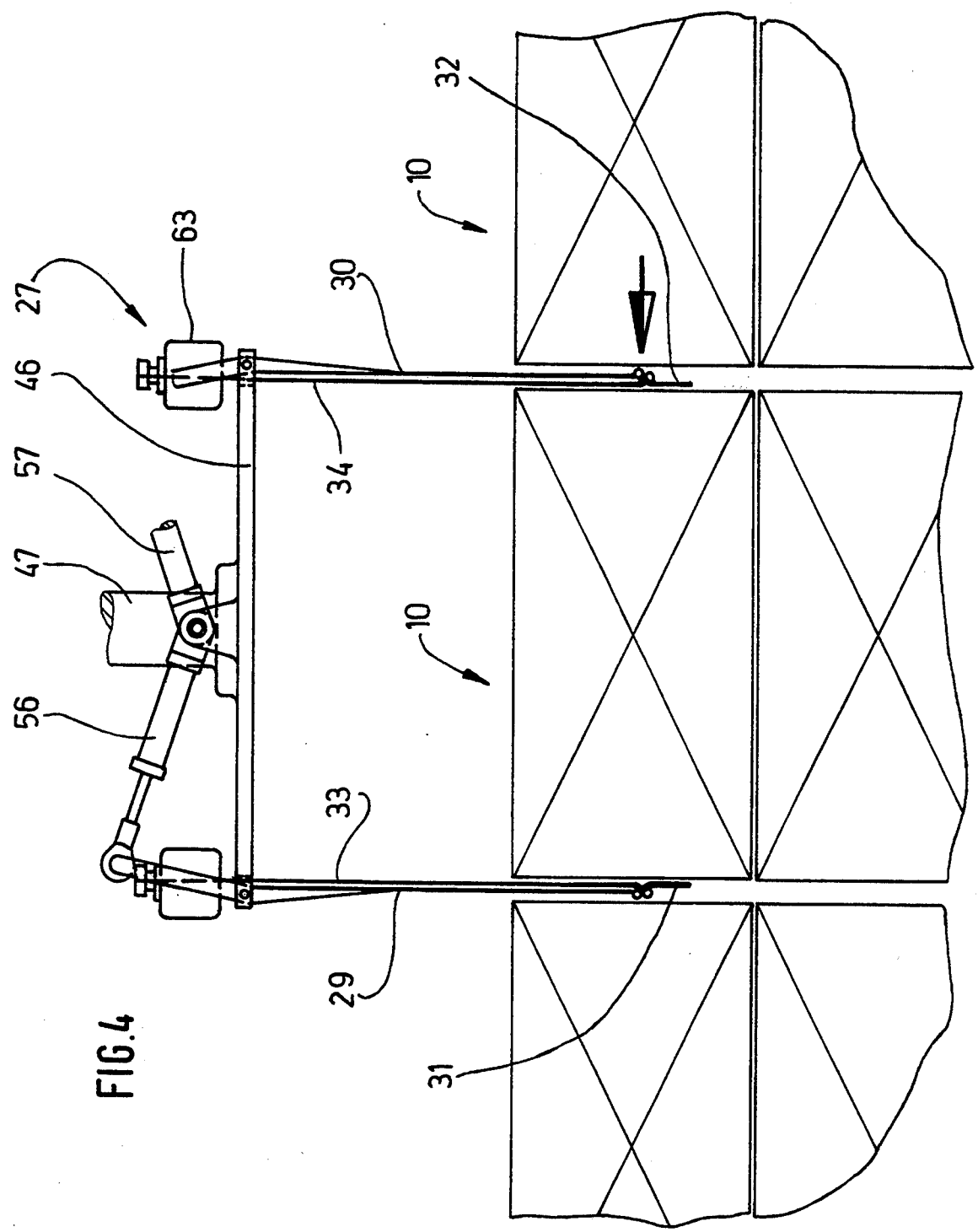
FIG. 4 shows a position of the gripper after an article has been deposited on a stack.

The carrying legs 31, 32 can be disengaged from the carton 10 while the carrying arms 29, 30 are still in the vertical position. For this purpose, the carrying legs 31, 32 are mounted at the lower end of the carrying arms 29, 30 in an articulated manner. As a result of pivoting movements, the carrying legs 31, 32 can be moved from the essentially horizontally directed carrying position (FIG. 3) to an upright or vertical position (FIG. 4). The carrying legs 31, 32 are mainly moved to this latter position when the cartons 10 are deposited.

The carrying legs 31, 32 are pivoted by means of actuating means in the form of actuating webs 33, 34 which extend at a small distance to the associated carrying arms 29, 30, and in the present case parallel thereto. The actuating webs 33, 34 transfer tensile or pressing forces to the carrying legs 31, 32 (which are subjected to compressive forces) and thus effect the pivoting movement.

Figure 5:
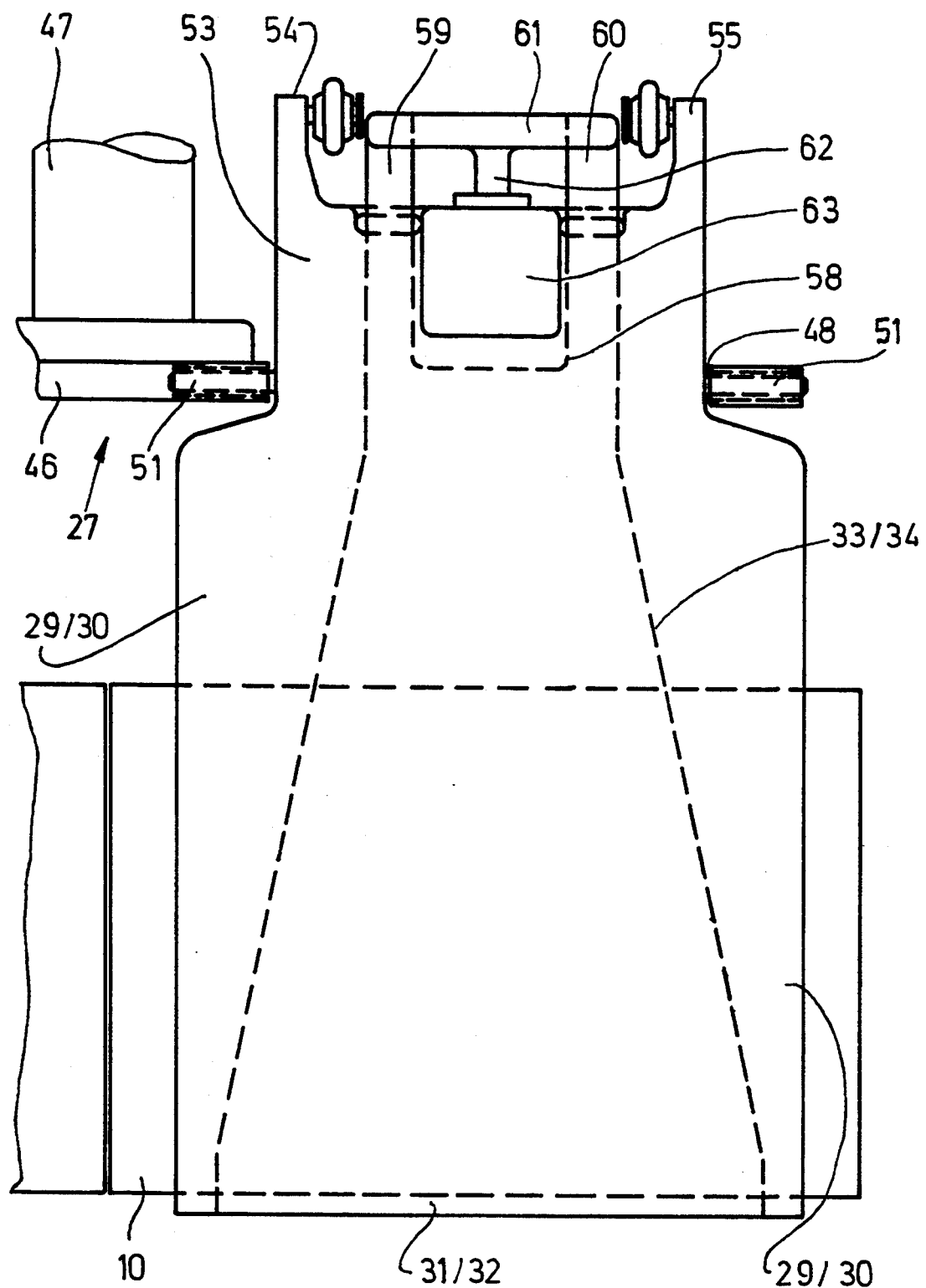
FIG. 5 shows a view, offset by 90° relative to FIG. 2 and FIG. 3, of a gripper or a carrying means thereof.
Figure 6:
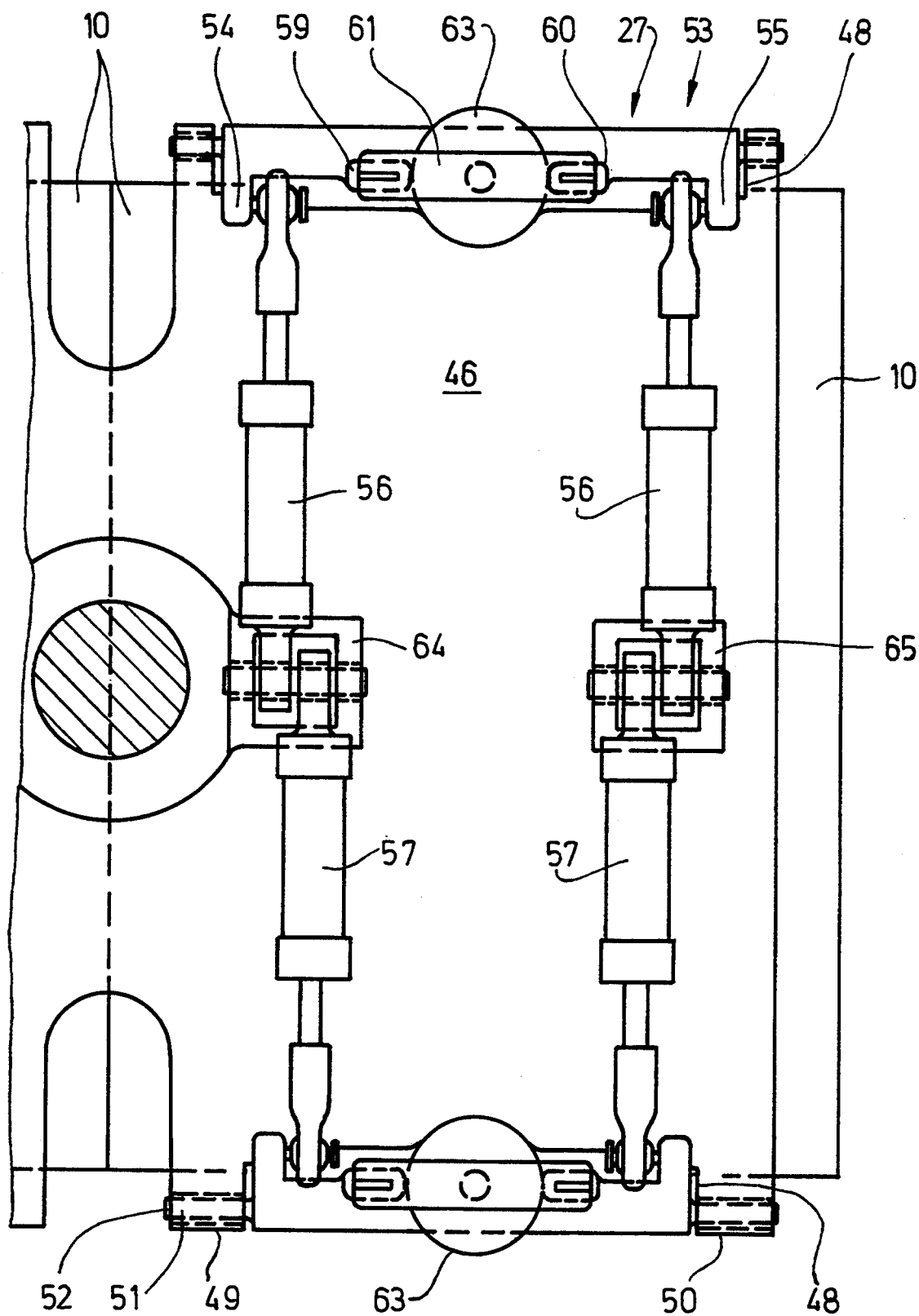
FIG. 6 is a top plan view of a part of the gripper.
Figure 7:
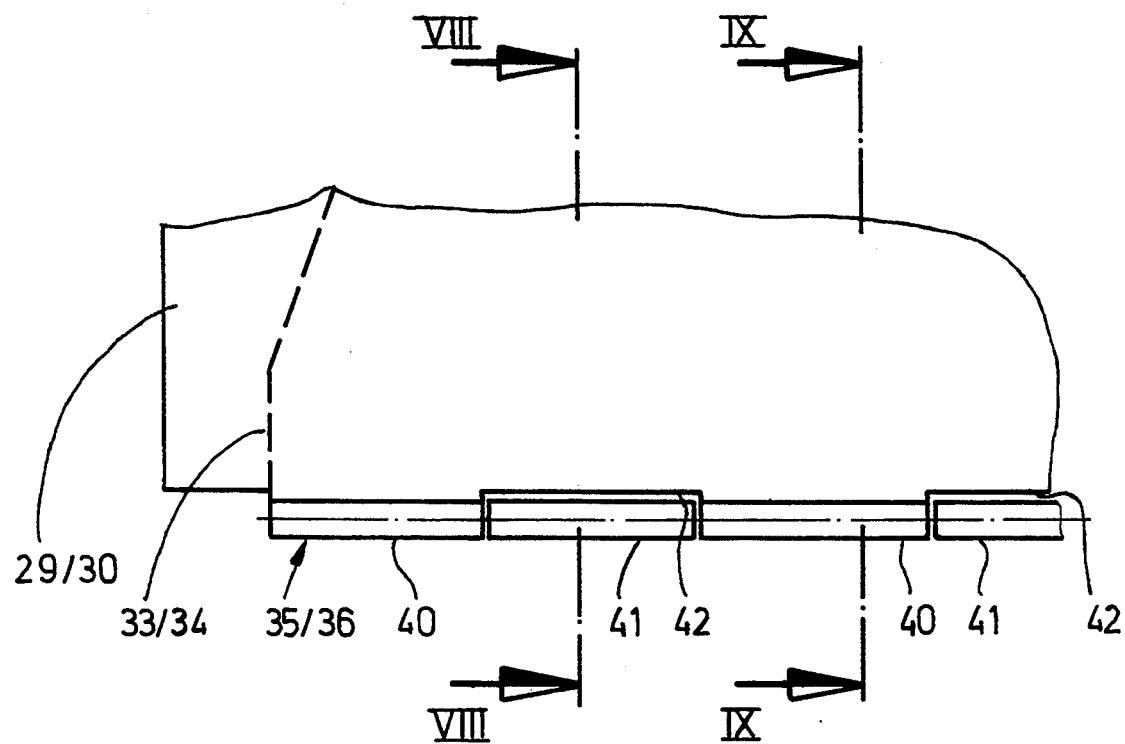
FIG. 7 shows a detail of the gripper, particularly the lower end of a carrying means, on an enlarged scale.

To conduct the movements, the carrying legs 31, 32 are each attached at the lower end of the carrying arms 29, 30 by means of joint or continuous hinge 35, 36. The carrying arms 29, 30 are designed like a plate or flat section (made of a plate having a sufficient thickness). A s is evident particularly from FIG. 5, the width of the ca s trying arms 29, 30 approximately corresponds to the dimension of the associated (narrow) side face of the carton 10. In the present case, the carrying legs 31, 32 have a length which corresponds to the width of the carrying arms 29, 30, so that the cartons 10 are grasped over a sufficient length. The hinges 35, 36 also extend over the entire width of the carrying arms 29, 30, that is to say over the length of the carrying legs 31, 32.

Figure 8:
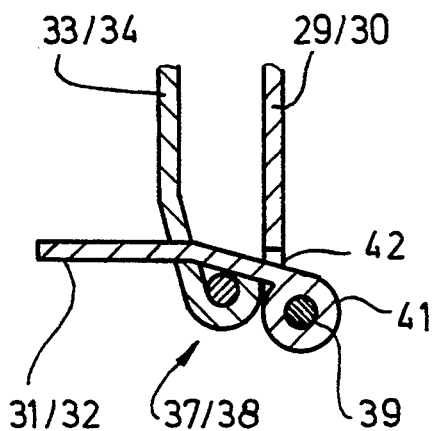
FIG. 8 is a section taken along line VIII—VIII of the detail of FIG. 7.
Figure 9:
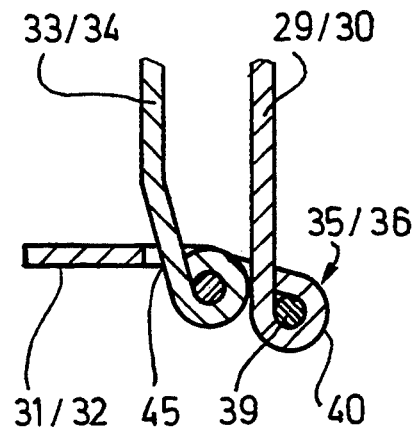
FIG. 9 is a section taken along line IX—IX of the detail of FIG. 7.
Figure 10:
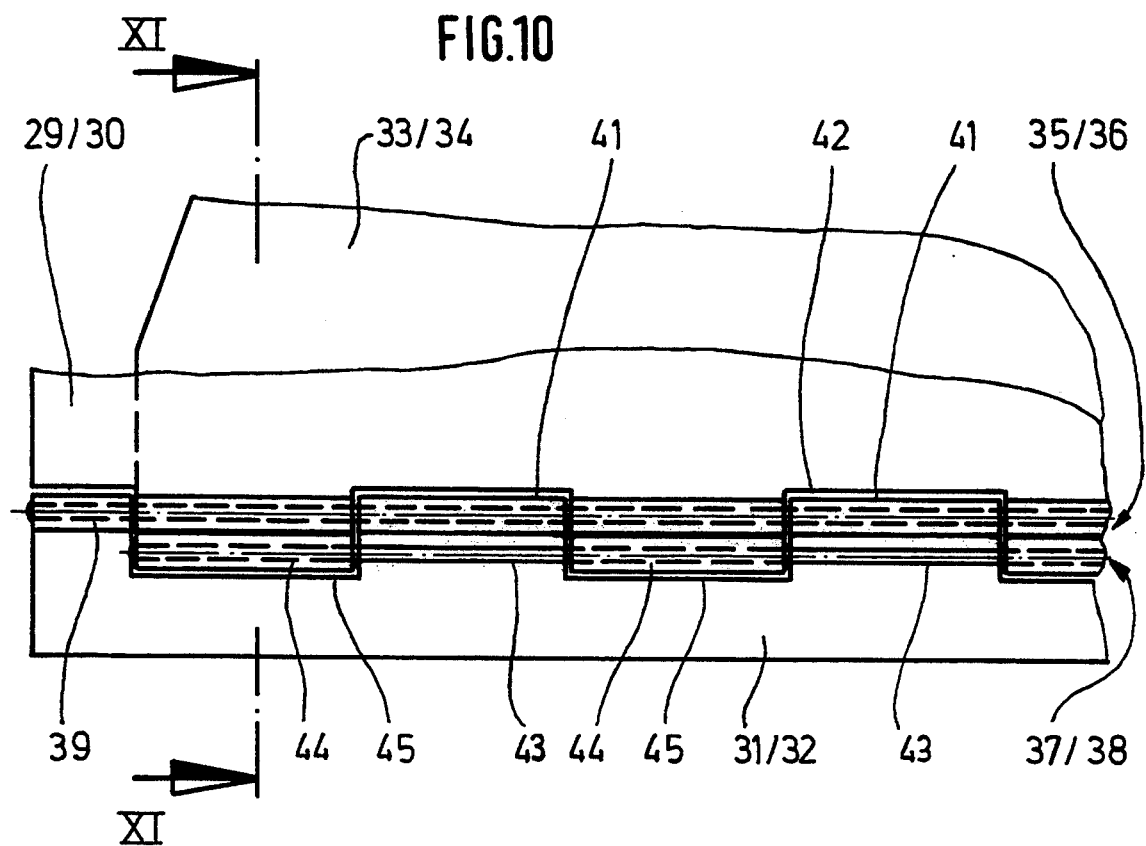
FIG. 10 shows the detail of FIG. 7 in a different position, namely with extended carrying legs.
Figure 11:
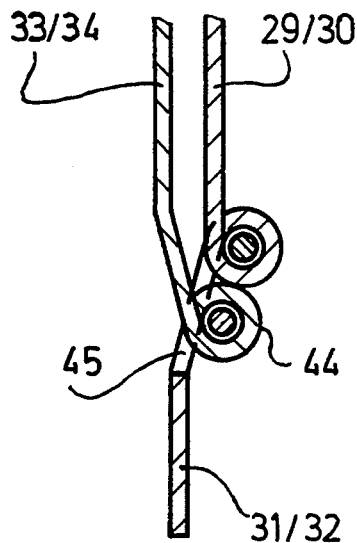
FIG. 11 is a section taken along the line XI—XI of the detail of FIG. 10, at the beginning of the pivoting movement of the carrying leg into the carrying position
Figure 12:
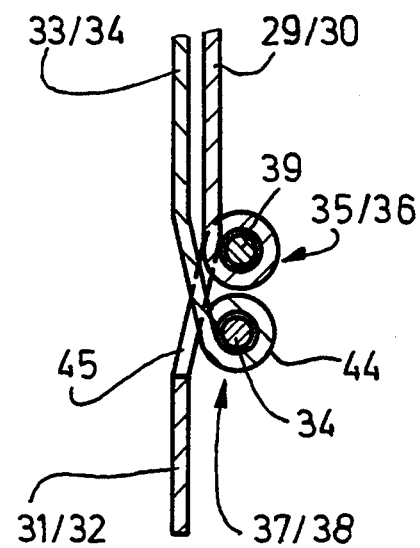
FIG. 12 shows a view corresponding to FIG. 11 but with a completely extended carrying leg.

In the present exemplary embodiment, the carrying legs 31, 32 are mounted as one-armed levers. The actuating webs 33, 34 are connected to the carrying leg 31, 32 at the confronting sides, i.e. at the side confronting the carton 10. When tensile forces are generated in the actuating webs 33, 34, the carrying legs 31, 32 are moved from a vertical and downwardly directed position (FIG. 12) to a horizontally directed position as illustrated in FIGS. 8 and 9. When compressive forces are transferred via the actuating webs 33, 34, the pivoting movement is directed in the opposite direction and results in a position as illustrated in FIG. 12.

The actuating webs 33, 34 are also very wide and have transverse dimensions which are slightly smaller than those of the carrying arms 29, 30. The actuating webs 33, 34 are also made of a thin-walled flat material.

The lower ends or edges of the actuating webs 33, 34 are also connected to the carrying legs 31, 32 in an articulated manner, specifically via actuating hinges 37, 38 which extend parallel to the hinges 35, 36 and slightly offset in the direction towards the carton 10 which is to be transported.

The hinges 35, 36 and 37, 38 are in the form of classical piano hinges. A continuous hinge rod 39 of the hinges 35, 36 is surrounded by a hinge sleeve 40 or 41 formed by edge portions of, on the one hand, the carrying arms 29, 30 and, on the other hand, the carrying legs 31, 32. The hinge sleeves 40 of the carrying arms 29, 30 are spaced apart from one another, an d the hinge sleeves 41 of the carrying legs 31, 32 enter recesses 42 located inbetween the hinge sleeves 40. The hinge sleeves 41 of the carrying legs 31, 32 are also spaced apart and can be rotated on the hinge rod 39.

A further parallel hinge rod 43 of tile actuating hinge 37, 38 is surrounded by hinge sleeves 44 of the actuating webs 33, 34. The hinge sleeves 44 are located within recesses 45 of the carrying legs 31, 32. In the region between two adjacent recesses 45, the continuous hinge rod 43 is resting against the bottom or outer side of the carrying leg 31, 32. As a result, an upwardly directed movement of the actuating web 33, 34—relative to the carrying leg 31, 32—causes the carrying leg 31, 32 to rotate on the hinge rod 39 so that it is pivoted into the horizontal carrying position. The lower end of the actuating web is bent to the outside.

The above described arrangement of the carrying legs 31, 32 on the carrying arms 29, 30 and the connection of the actuacting webs 33, 34 with the carrying legs 31, 32 allow a very reliable movement of the carrying legs 31, 32. Moreover, the carrying position assumed by the carrying legs 31, 32 when they are horizontally directed is stable. The particular advantage, however, is that in the downwardly directed extended position of the carrying legs 31, 32 (FIG. 12), the associated hinges 35, 37 and 36, 38, respectively, are located exactly underneath one another, so that the dimensions in the transverse direction are extremely small. The carrying legs 31, 32 and the associated actuating webs 33, 34 are extending parallel and are also located at a very small distance to one another (FIG. 12).

As a result, it is possible to deposit the cartons 10 even in places where adjacent cartons or other articles only leave small lateral gaps (FIG. 4). In this case, the carrying legs 31, 32 are disengaged from the carton 10 while carton 10 is being deposited and has reached a position slightly above the depositing plane or slightly above an already deposited carton 10. In this process, the flat plate-like actuating webs 33, 34 rest against the confronting side faces of the cartons 10, so that they glide down along the actuating webs 33, 34 under gravity until they are deposited on the supporting surface (carton). Now, the gripper 27 can be moved upwards and in this process the carrying arms 29, 30, together with the carrying legs 31, 32 and the actuating webs 33, 34, can be moved within a very narrow gap between adjacent cartons.

The carrying means for the cartons 10 described above are arranged on a common support of tile gripper 27, which in the present case is in the form of a support plate 46. This support plate 46 is connected with the articulated arm 24, in the present case via a central support rod 47.

The carrying arms 29, 30 are attached at the outer edges of the support plate 46 in a pivotable manner. The carrying arms 29, 30 rest in lateral depressions 48 of the support plate 46. Projections 49, 50 which laterally limit the depression 48 extend the support plate 46 and serve for holding a bearing 51 for bearing journals 52 on the oppositely situated sides of the carrying arms 29, 30.

Figure 2:
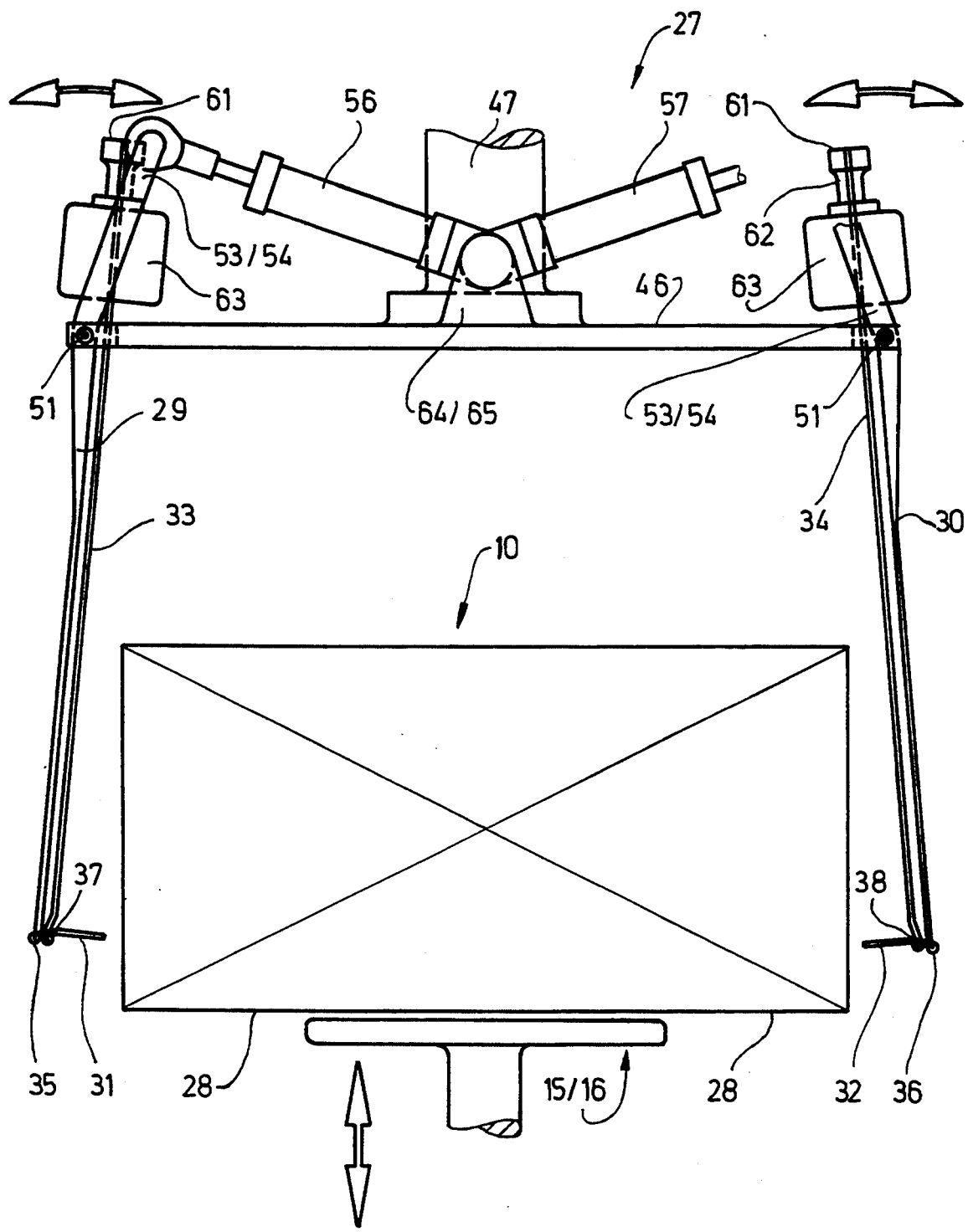
FIG. 2 is a side view of a detail of a gripper during reception of an article (carton)

To operate the carrying arms 29, 30 in the form of a pivoting movement, the carrying arms 29, 30 are extended towards the top beyond the bearing 53, 52 and thus form a rotating member 53 whose upper end is designed fork-like. Piston rods of pressure medium cylinders 56, 57 engage lateral fingers 54, 55. Consequently, the carrying arms 29, 30 can be pivoted from the vertical position to an inclined position as illustrated in FIG. 2 by means of these pressure medium cylinders 56, 57.

The actuating webs 33, 34 are connected to the carrying arms 29, 30 in such a way that they also conduct the pivoting movement.

The upper portion of the actuating webs 33, 34 is also provided with a recess 58 so that lateral webs 59, 60 are formed which are connected to one another by a crossmember 61 at their upper ends. This crossmember 61 is located at the end of a piston rod 62 of a pressure medium cylinder 63 in the form of a short-stroke cylinder. The pressure medium cylinder 63 is connected to the associated carrying arm 29, 30, particularly to its rotating member 53. The pressure medium cylinder 63 effects the upward and downward movements of the actuating webs 33, 34 which adjust the carrying legs 31, 32.

The already mentioned pressure medium cylinders 56, 57 for pivoting the carrying arms 29, 30 are mounted on the support plate 46, particularly in bearing blocks 64, 65 located on the top side of the support plate 46 in a longitudinal mid-plane of said support plate 46.

The pivoting movement of the carrying arms 29, 30 is of significance for the mode of operation of the gripper 27. When a carton 10 is taken over from the platform 15, 16, the carrying leg 35, 36 is moved to the horizontal carrying position before the carton 10 is grasped (FIG. 2). The carrying arms 29, 30 are moved downwards laterally along the carton 10 until the carrying legs 31, 32 are located below the carton 10. By pivoting the carrying arms 29, 30 into the upright position, the carrying legs 31, 32 are moved against the bottom side of the carton 10, so that said carton 10 can be lifted and transported in the described manner.

In the present exemplary embodiment, the support plate 46 has a double width, so that two cartons 10 can be grasped at one time. The gripper 27 is provided with two pairs of oppositely situated carrying arms 29, 30 with carrying legs 31, 32 etc. These interconnected partial grippers, which are each assigned to one carton 10, can be controlled individually so that the two received cartons 10 can be deposited individually and at different locations. If required, it is also possible to pick up the cartons 10 at different locations. Alternatively it is possible to handle double-sized cartons in which case both pairs of carrying arms 29, 30 grasp the one carton.

We claim:

1. In an apparatus for receiving, conveying and depositing cuboid articles, and comprising a liftable, lowerable and transversely movable gripper (27) having at least two vertical carrying arms (29, 30) for grasping at least one article (10), said vertical carrying arms (29, 30), during transport of an article (10), extending on opposite sides of the article, the improvement comprising:

a support plate (46) on the gripper and having two oppositely situated edges on which said carrying arms (29, 30) are pivotably mounted;
 at least two first pressure medium cylinders (56, 57) for pivoting said carrying arms (29, 30) from a vertical position to an inclined position;
 at least two carrying legs (31, 32) pivotably attached to the carrying arms (29, 30);
 at least two vertically extending actuating means (33, 34), attached to said support plate (46), for moving said carrying legs (31, 32) between a carrying position, in which said carrying legs are horizontally directed, and a release position in which said carrying legs are essentially vertically directed; and
 at least two second pressure medium cylinders (63), attached between said support plate and said actuating means at a position above said support plate, for moving said actuating means (33, 34) up and down so that said carrying legs (31, 32) move between the carrying position and the release position;
 wherein the carrying legs (31, 32) are one-armed levers, and wherein said actuating means (33, 34) are connected to said carrying legs (31, 32) in an articulated manner at a point spaced from said carrying arms (29, 30) at a side confronting the article (10), and in such a way that said carrying legs (31, 32) are held in said carrying position by tensile forces in said actuating means (33, 34).

2. The apparatus as claimed in claim 1, wherein the actuating means are actuating webs (33, 34) that are material and that extend parallel to the carrying arms (29, 30).

3. The apparatus as claimed in claim 2, wherein the carrying arms (29, 30) are flat and have a width which approximately corresponds to a dimension of a confronting side of the article.

4. The apparatus as claimed in claim 3, wherein the carrying legs (31, 32) engage a bottom side of the article (10) at oppositely situated sides thereof when said article (10) is transported.

5. The apparatus as claimed in claim 3, wherein each of the carrying legs (31, 32) is attached to a lower end of one of the carrying arms (29, 30) in an articulated manner by first hinges (35, 36) which extend over the entire width of said carrying arms (29, 30).

6. The apparatus as claimed in claim 5, wherein lower ends of the actuating webs (33, 34) are connected to the carrying legs (31, 32) by an actuating hinge (37, 38) arranged parallel to the first hinges (35, 36).

7. The apparatus as claimed in claim 6, wherein the actuating hinge (37, 38) is provided with a continuous hinge rod (43) on which portions of the carrying legs (31, 32) rest.

8. The apparatus as claimed in claim 5, wherein, in an extended vertical position of the carrying legs (31, 32), said carrying legs (31, 32) extend the actuating webs (33, 34), and the hinges (35, 36) and the actuating hinges (37, 38) are located underneath one another, each of said carrying arms (29, 30) and said actuating webs (33, 34) being closely adjacent one another.

9. The apparatus as claimed in claim 8, wherein the carrying arms (29, 30) are movable into an inclined position, diverging in the direction towards the carrying legs (31, 32), when an article is received.

10. The apparatus as claimed in claim 1, wherein said first pressure medium cylinders (56, 57) are arranged on a top side of the support plate (46) for actuating the carrying arms (29, 30) in a pivoting manner, said first pressure medium cylinders (56, 57) being connected to extensions of the carrying arms.

11. The apparatus as claimed in claim 1, wherein the gripper is dimensioned for receiving several articles (10) in juxtaposition, each carton (10) being associated with two oppositely situated carrying arms (29, 30) with carrying legs (31, 32) for grasping said carton (10), and pairs of carrying arms (29, 30) and carrying legs (31, 32) being individually controllable for depositing individual cartons.

* * * * *